United States Patent
Shimizu et al.

(10) Patent No.: US 9,847,056 B2
(45) Date of Patent: Dec. 19, 2017

(54) PICTURE SIGNAL PROCESSING CIRCUIT, PICTURE SIGNAL PROCESSING METHOD, AND DISPLAY UNIT

(71) Applicant: JOLED INC., Tokyo (JP)

(72) Inventors: Hidehisa Shimizu, Tokyo (JP); Shoji Araki, Tokyo (JP)

(73) Assignee: JOLED Inc., Tokyo (JP)

( * ) Notice: Subject to any disclaimer, the term of this patent is extended or adjusted under 35 U.S.C. 154(b) by 0 days.

(21) Appl. No.: 14/891,121

(22) PCT Filed: Mar. 31, 2014

(86) PCT No.: PCT/JP2014/059468
§ 371 (c)(1),
(2) Date: Nov. 13, 2015

(87) PCT Pub. No.: WO2014/188789
PCT Pub. Date: Nov. 27, 2014

(65) Prior Publication Data
US 2016/0093248 A1    Mar. 31, 2016

(30) Foreign Application Priority Data
May 20, 2013 (JP) .................................. 2013-105756

(51) Int. Cl.
*G09G 3/32* (2016.01)
*G09G 3/3225* (2016.01)
(Continued)

(52) U.S. Cl.
CPC ......... *G09G 3/3225* (2013.01); *G09G 3/3233* (2013.01); *H04N 5/202* (2013.01);
(Continued)

(58) Field of Classification Search
CPC ............... G09G 3/3648; G09G 3/2003; G09G 2320/064
See application file for complete search history.

(56) References Cited

U.S. PATENT DOCUMENTS 8,547,316 B2    10/2013  Doi et al.
2003/0156086 A1*  8/2003  Maeda ...................... G06F 3/14
                                                    345/89

(Continued)

FOREIGN PATENT DOCUMENTS

JP    2002-165111        7/2002
JP    2006-330292 A     12/2006
(Continued)

OTHER PUBLICATIONS

International Search Report; Application No. PCT/JP2014/059468; Filed: Mar. 31, 2014.
Japanese Office Action for JP2015-518139 dated May 2, 2017.

*Primary Examiner* — Olga Merkoulova
(74) *Attorney, Agent, or Firm* — Michael Best & Friedrich LLP

(57) ABSTRACT

A picture signal processing circuit includes a gamma correction section configured to perform gamma correction on a picture signal; and a gamma modification section configured to provide an offset component corresponding to one or both of a refresh rate and a light emission duty, to the picture signal gamma-corrected by the gamma correction section.

12 Claims, 10 Drawing Sheets

(51) Int. Cl.
*H04N 5/202* (2006.01)
*G09G 3/3233* (2016.01)

(52) U.S. Cl.
CPC ............ *G09G 2300/0819* (2013.01); *G09G 2300/0842* (2013.01); *G09G 2300/0866* (2013.01); *G09G 2320/064* (2013.01); *G09G 2320/0673* (2013.01); *G09G 2340/0435* (2013.01)

(56) References Cited

U.S. PATENT DOCUMENTS

| | | | | |
|---|---|---|---|---|
| 2007/0018919 | A1* | 1/2007 | Zavracky | G09G 3/3406 345/87 |
| 2007/0097107 | A1 | 5/2007 | Furukoshi | |
| 2008/0136763 | A1* | 6/2008 | Ohashi | G09G 3/3611 345/89 |
| 2009/0135301 | A1 | 5/2009 | Inoue et al. | |
| 2009/0147032 | A1 | 6/2009 | Kim | |
| 2010/0328359 | A1* | 12/2010 | Inoue | G09G 3/2077 345/690 |

FOREIGN PATENT DOCUMENTS

| | | |
|---|---|---|
| JP | 2008-11382 A | 1/2008 |
| JP | 2008-148055 A | 6/2008 |
| JP | 2009-58675 A | 3/2009 |
| JP | 2009-141302 A | 6/2009 |
| JP | 2009122552 A | 6/2009 |

* cited by examiner

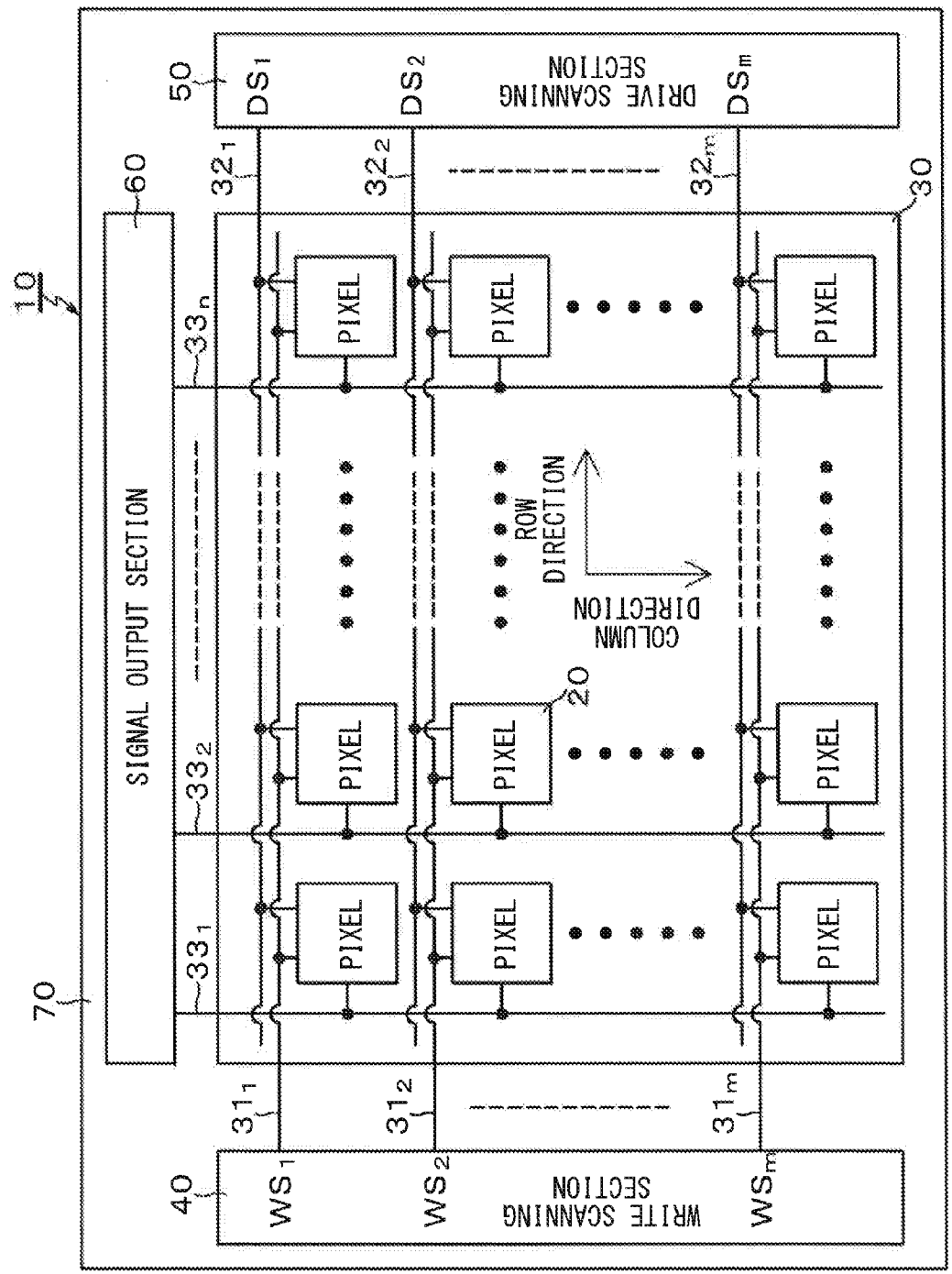
[FIG. 1]

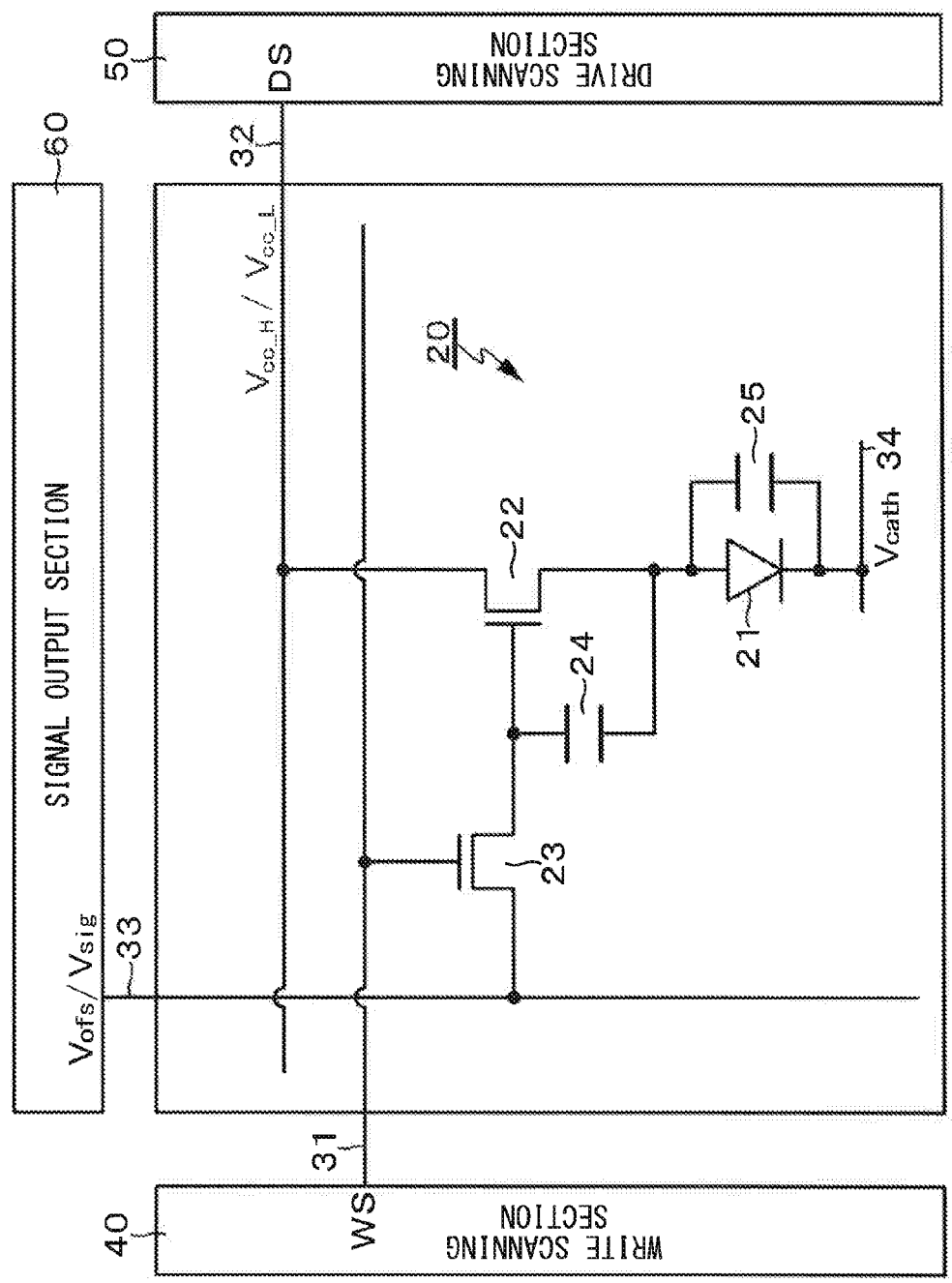
[FIG. 2]

[ FIG. 3A ]
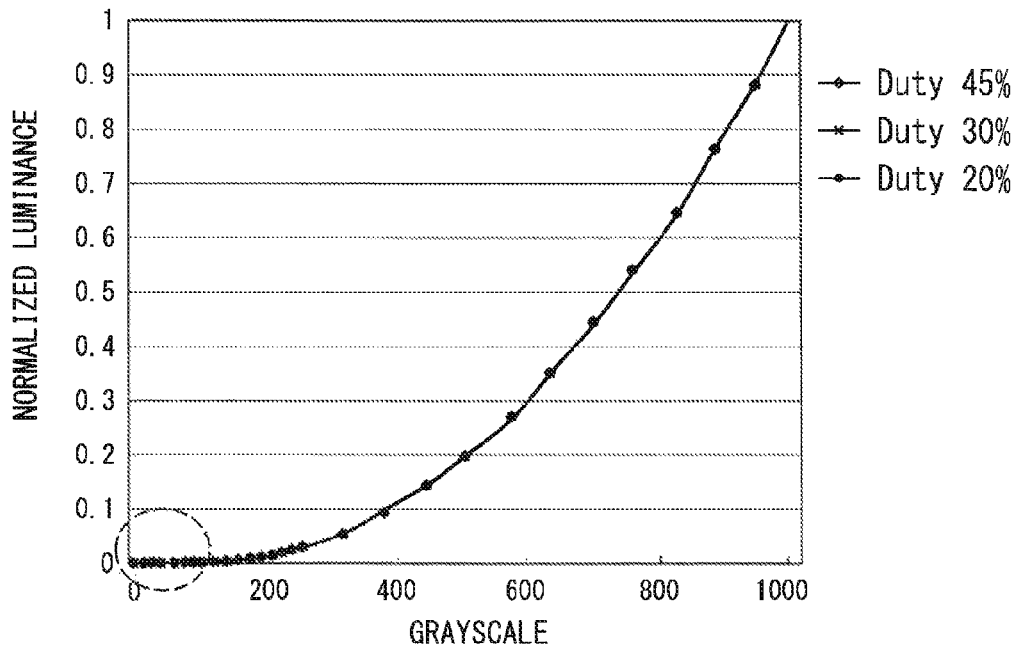
[ FIG. 3B ]
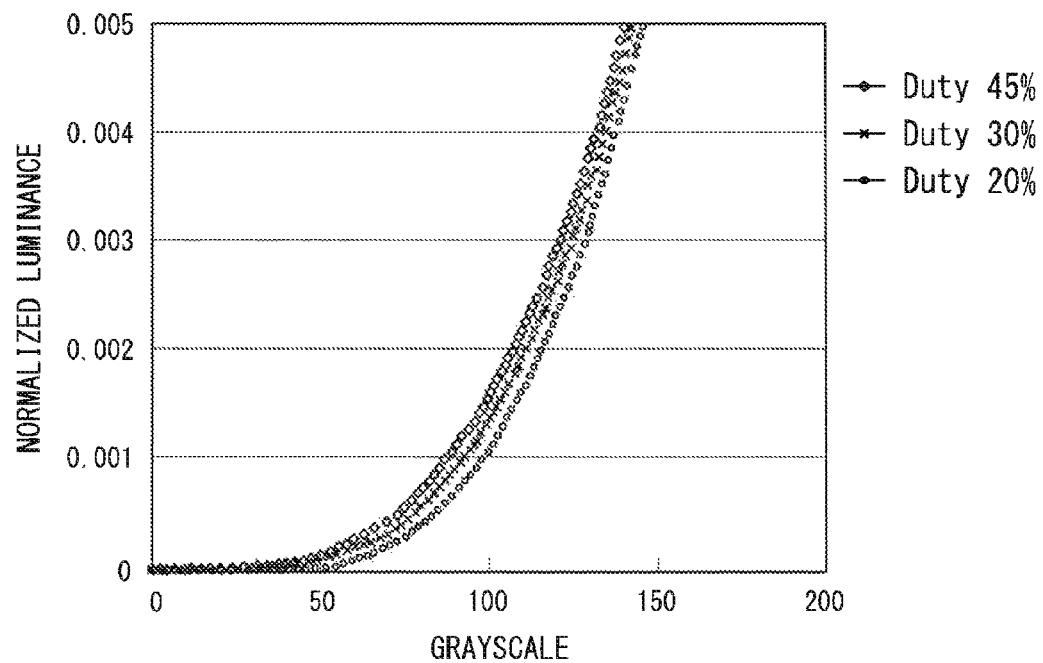

[ FIG. 4A ]
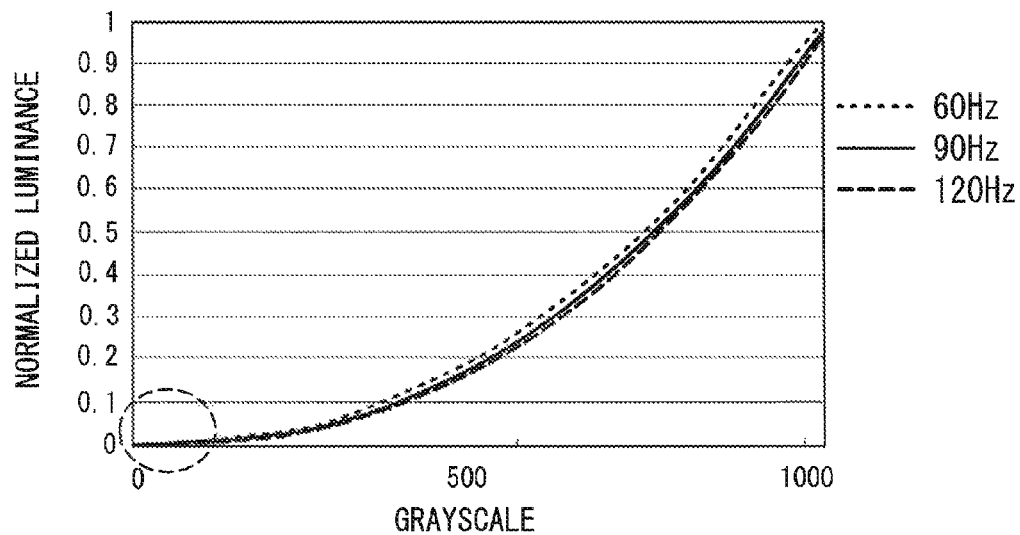
[ FIG. 4B ]
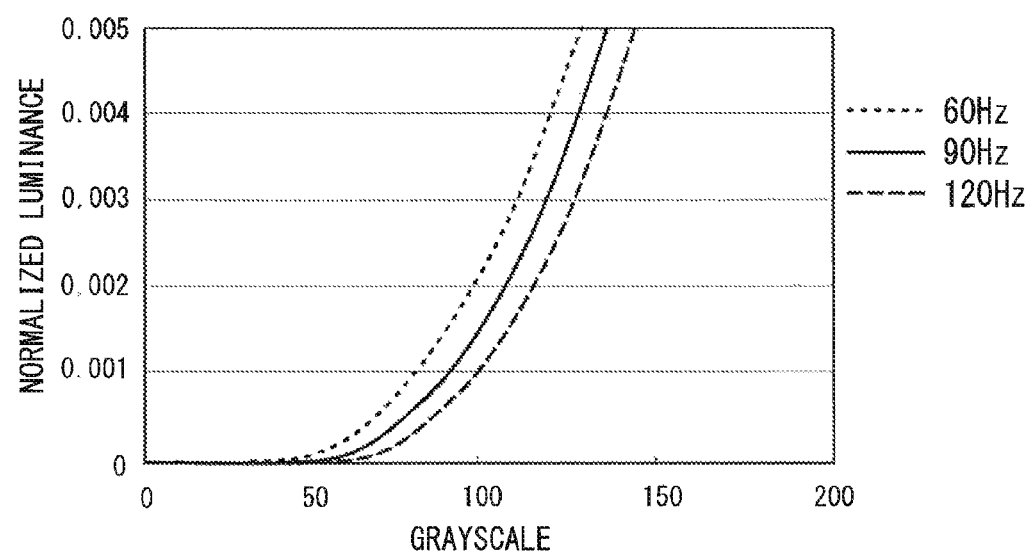

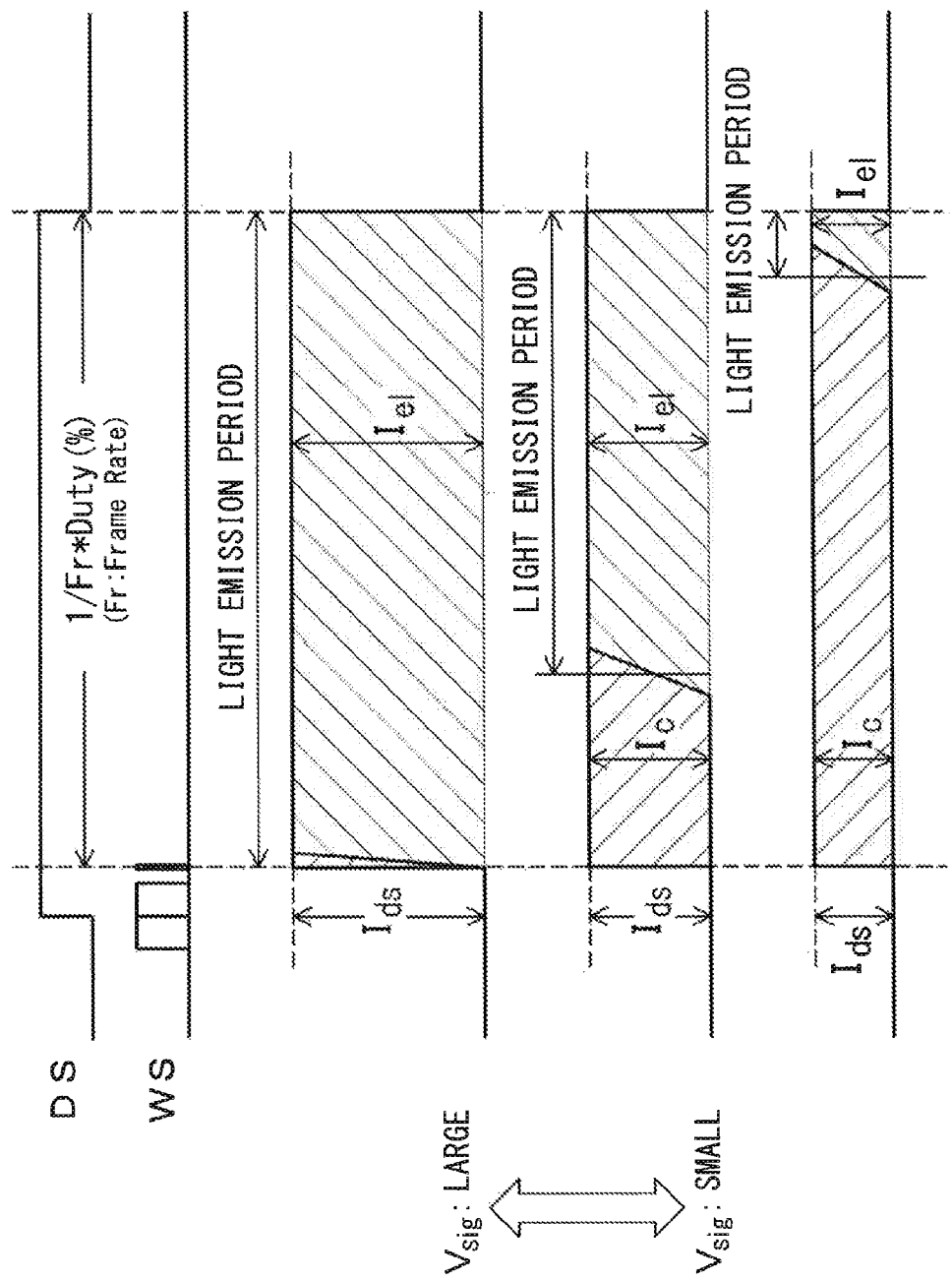
[ FIG. 5 ]

[ FIG. 6 ]
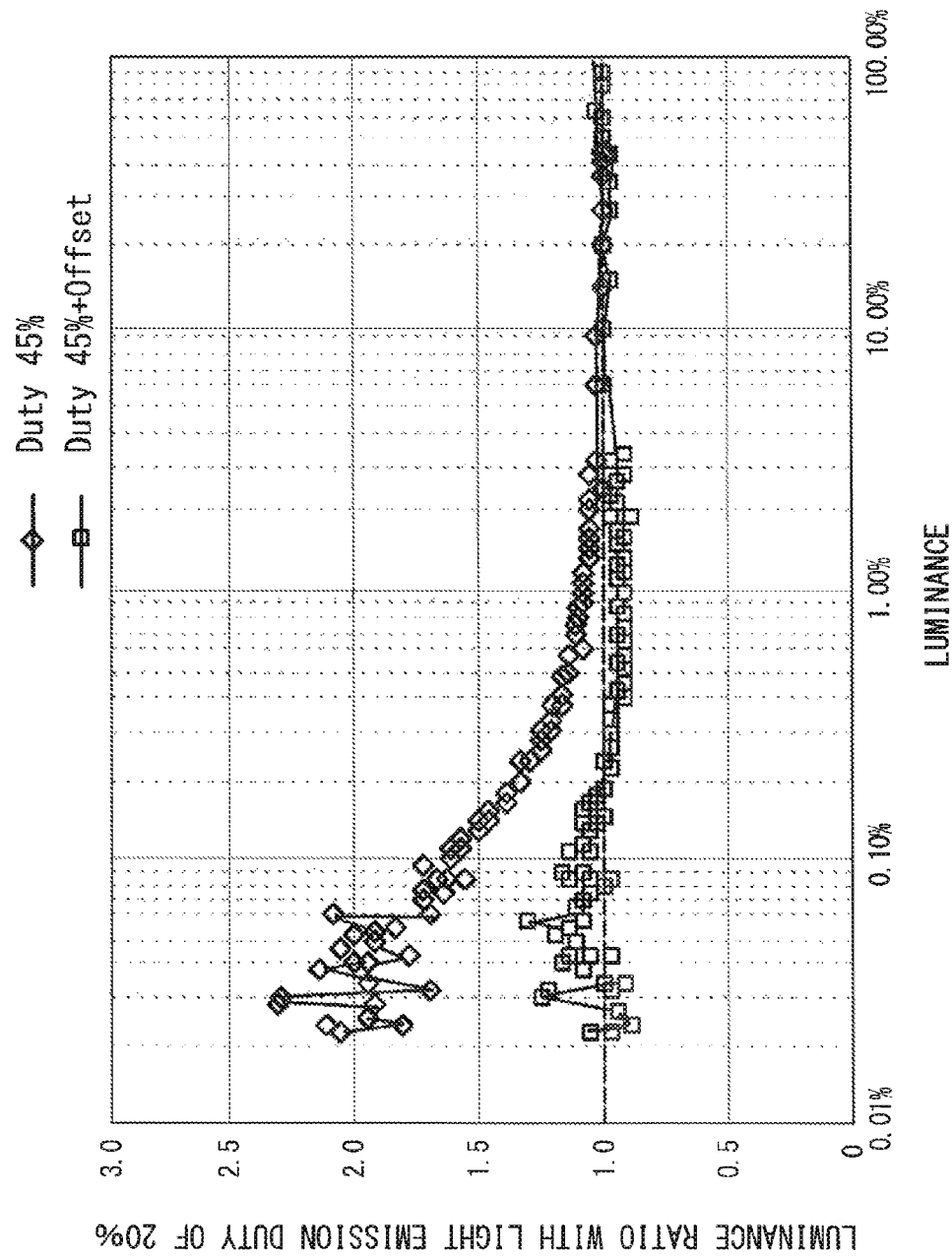

[ FIG. 7A ]
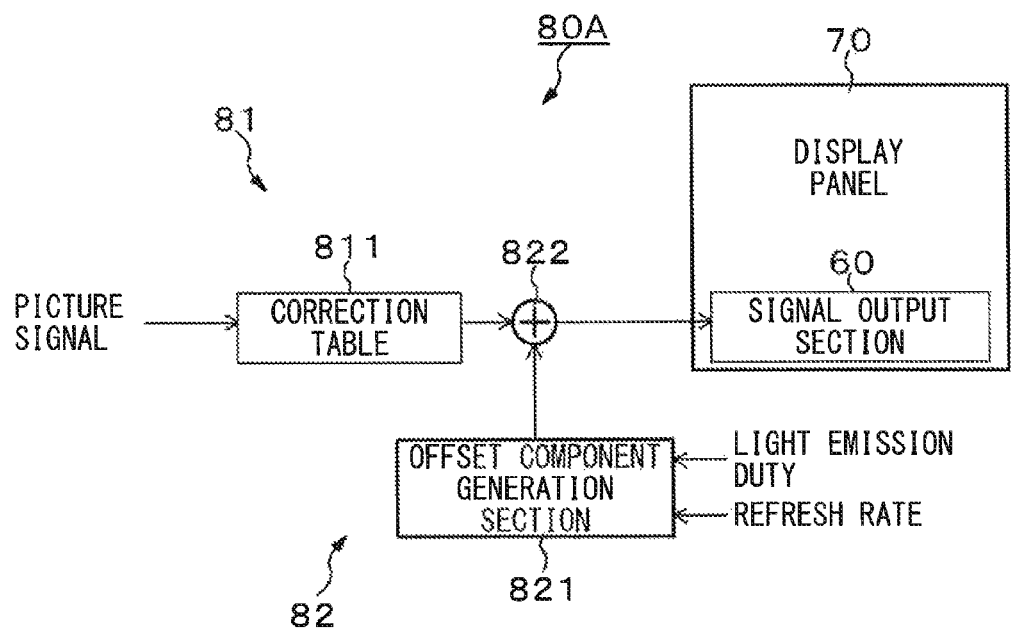
[ FIG. 7B ]
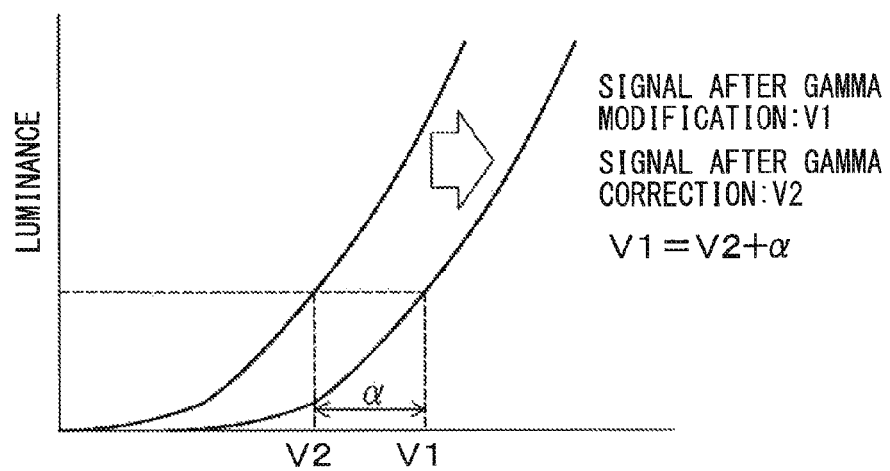
SIGNAL AFTER GAMMA MODIFICATION: V1
SIGNAL AFTER GAMMA CORRECTION: V2
$V1 = V2 + \alpha$

[FIG. 8]
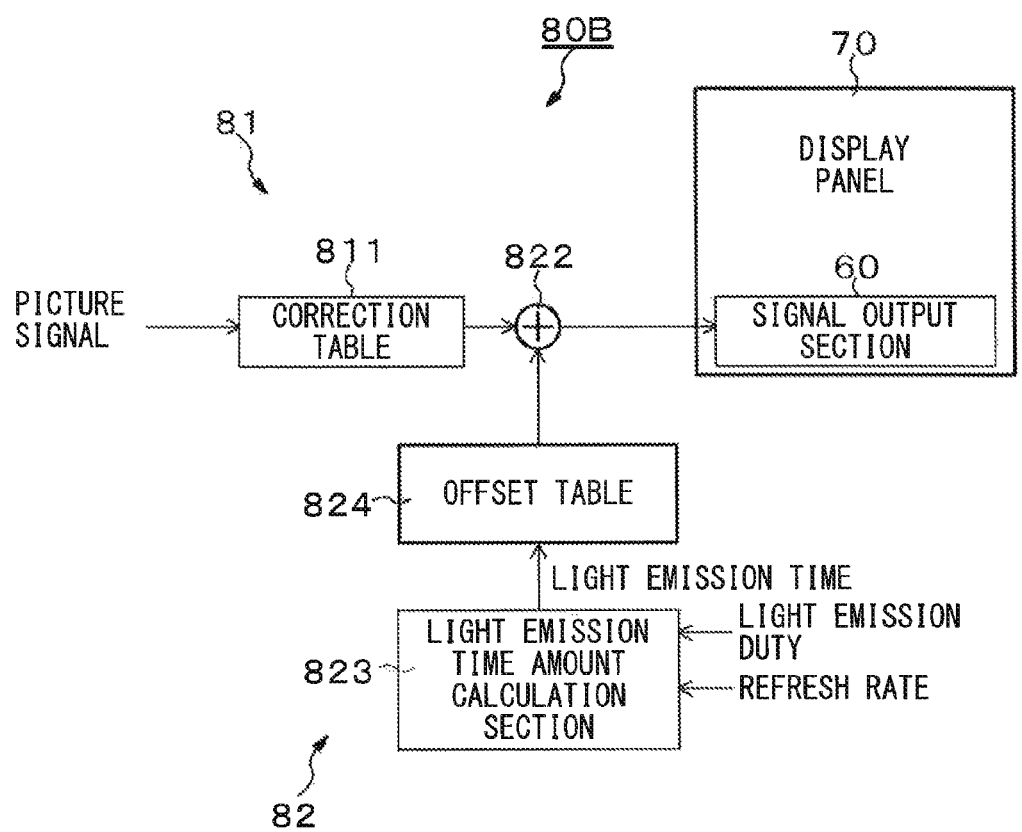

[ FIG. 9A ]
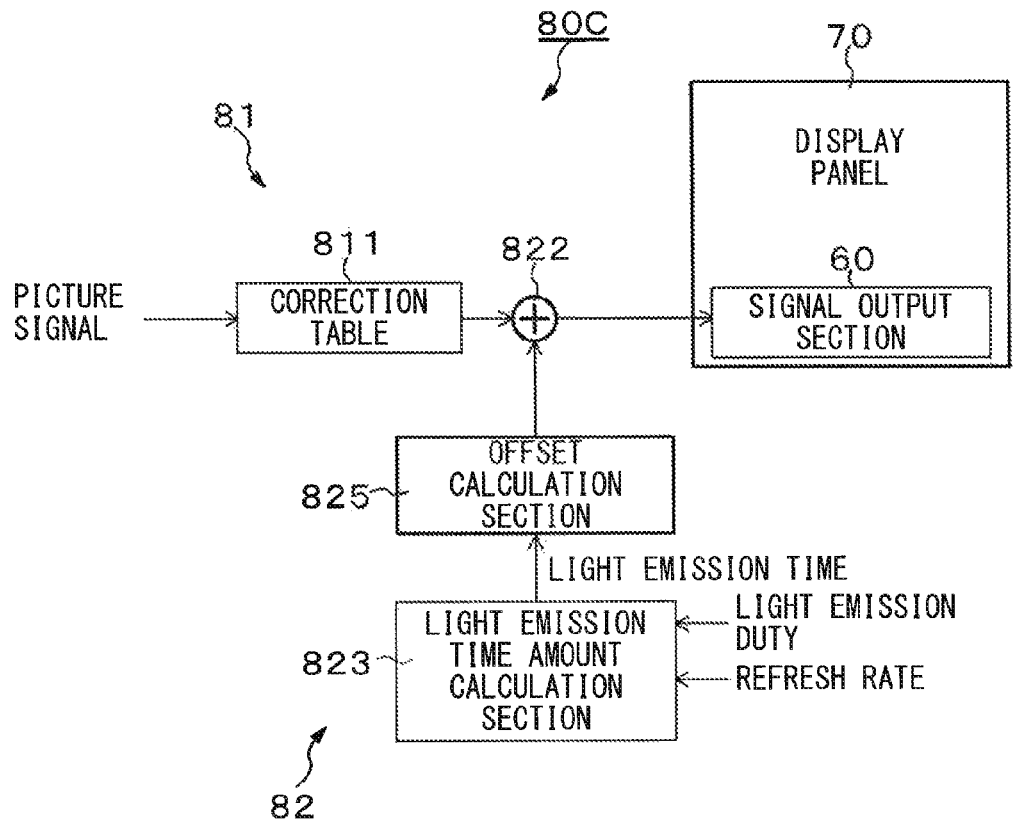
[ FIG. 9B ]
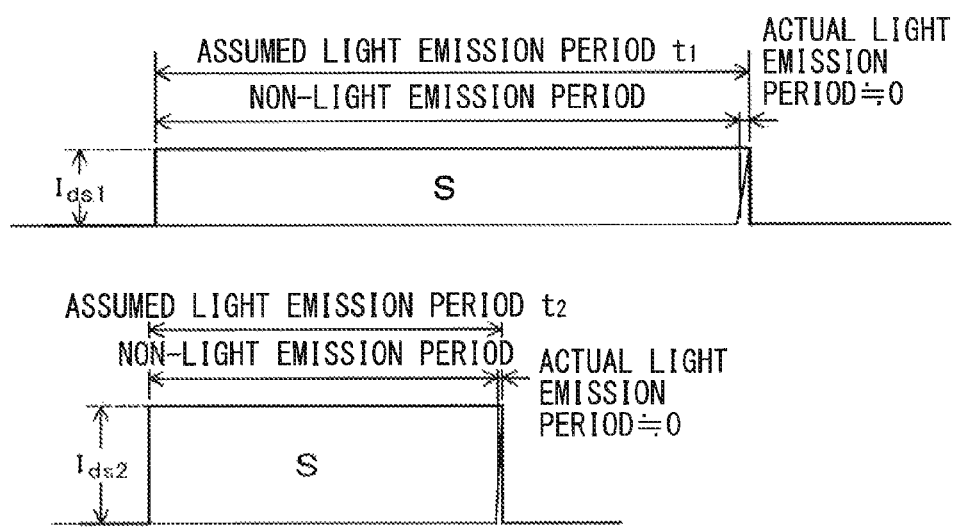

[ FIG. 10 ]
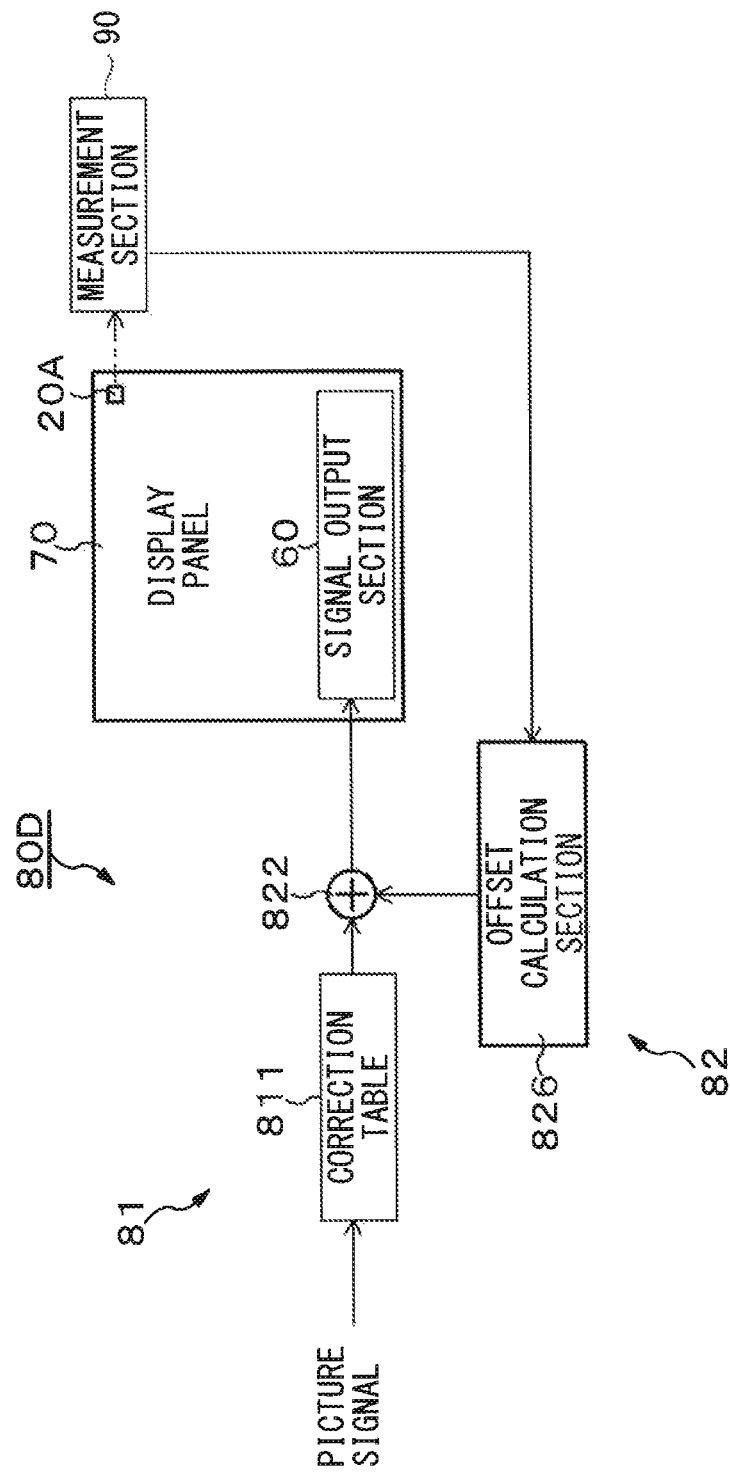

PICTURE SIGNAL PROCESSING CIRCUIT, PICTURE SIGNAL PROCESSING METHOD, AND DISPLAY UNIT

TECHNICAL FIELD

The present disclosure relates to a picture signal processing circuit, a picture signal processing method, and a display unit.

BACKGROUND ART

It is known that an electrooptical element provided in each pixel shows element-specific non-linear optical response with respect to a drive voltage in an display unit. Therefore, in driving the electrooptical element showing non-linear optical response, gamma correction is performed on a picture signal (for example, see PTL1).

CITATION LIST

Patent Literature

PTL 1: Japanese Unexamined Patent Application Publication No. 2002-165111

SUMMARY OF INVENTION

Technical Problem

There is a case where a refresh rate (a frame rate) or a light emission duty is varied in the display unit, depending on picture signal format or driving mode. However, when one or both of the refresh rate and the light emission duty are varied, characteristics of light emission luminance to the drive voltage, namely, gamma characteristics are varied, which causes variation in image quality.

Therefore, it is desirable to provide a picture signal processing circuit and a picture signal processing method that are adapted to obtain a picture without variation of image quality even if a refresh rate or a light emission duty is varied, and to provide a display unit including the picture signal processing circuit.

Solution of Problem

According to an embodiment of the disclosure, there is provided a picture signal processing circuit includes: a gamma correction section configured to perform gamma correction on a picture signal; and a gamma modification section configured to provide an offset component to the picture signal gamma-corrected by the gamma correction section, the offset component corresponding to one or both of a refresh rate and a light emission duty.

According to an embodiment of the disclosure, there is provided a picture signal processing method including providing an offset component corresponding to one or both of a refresh rate and a light emission duty, to a gamma-corrected picture signal.

According to an embodiment of the disclosure, there is provided a display unit including a picture signal processing circuit. The picture signal processing circuit includes: a gamma correction section configured to perform gamma correction on a picture signal; and a gamma modification section configured to provide an offset component to the picture signal gamma-corrected by the gamma correction section, the offset component corresponding to one or both of a refresh rate and a light emission duty.

In the picture signal processing circuit, the picture signal processing method, and the display unit according to the respective embodiments of the disclosure having the above-described respective configurations, when one or both of the refresh rate and the light emission duty are varied, the gamma characteristics vary (shift) in a grayscale direction (a magnitude direction of a signal voltage). The variation of the gamma characteristics causes variation of image quality. Thus, the offset component corresponding to one or both of the refresh rate and the light emission duty is provided to the gamma-corrected picture signal. As a result, it is possible to correct the variation of the gamma characteristics.

Advantageous Effects of Invention

According to the embodiments of the disclosure, it is possible to obtain a picture without variation of image quality even if the refresh rate or the light emission duty is varied because the variation of the gamma characteristics when one or both of the refresh rate and the light emission duty are varied is corrected.

Note that the effects described in the present specification are illustrative and non-limiting. Effects achieved by the technology may be effects other than those described above.

BRIEF DESCRIPTION OF DRAWINGS

FIG. 1 is a system configuration diagram illustrating outline of a basic configuration of an active matrix display unit to which an embodiment of the disclosure is applied.

FIG. 2 is circuit diagram illustrating an example of a specific circuit configuration of a pixel (a pixel circuit).

FIG. 3A is a diagram illustrating variation of gamma characteristics when light emission duty is varied, and FIG. 3B is a diagram illustrating a low-luminance light emission region surrounded by a dashed line in FIG. 3A in an enlarged manner.

FIG. 4A is a diagram illustrating variation of gamma characteristics when refresh rate is varied, and FIG. 4B is a diagram illustrating a low-luminance light emission region surrounded by a dashed line in FIG. 4A in an enlarged manner.

FIG. 5 is an explanatory diagram for generation principle of variation of gamma characteristics.

FIG. 6 is a diagram illustrating a graph in which luminance ratios with and without correction for variation of gamma characteristics when light emission duty is set to 45%, are plotted with gamma characteristics in which light emission duty is 20%, as reference.

FIG. 7A is a block diagram illustrating a configuration of a picture signal processing circuit according to embodiment 1, and FIG. 7B is a diagram for explaining action of the picture signal processing circuit according to the embodiment 1.

FIG. 8 is a block diagram illustrating a configuration of a picture signal processing circuit according to embodiment 2.

FIG. 9A is a block diagram illustrating a configuration of a picture signal processing circuit according to embodiment 3, and FIG. 9B is an explanatory diagram for a conversion expression of offset component (offset amount)

FIG. 10 is a block diagram illustrating a configuration of a picture signal processing circuit according to embodiment 4.

DESCRIPTION OF EMBODIMENTS

Hereinafter, some embodiments of the technology of the present disclosure (hereinafter, referred to as "embodiments") are described in detail below with reference to drawings. The disclosure is not limited to the embodiments, and various numerical values and the like in the embodiments are merely examples. In the following description, the same numerals are used to designate substantially the same components or components having the same function, and overlapped description thereof is omitted. Note that description will be given in the following order.

1. Entire description of picture signal processing circuit, picture signal processing method, and display unit according to embodiments of present disclosure
2. Display unit to which technology of present disclosure is applied
    2-1. System configuration
    2-2. Pixel circuit
    2-3. Gamma correction
3. Description of embodiments
    3-1. Embodiment 1
    3-2. Embodiment 2
    3-3. Embodiment 3
    3-4. Embodiment 4
4. Modifications Entire Description of Picture Signal Processing Circuit, Picture Signal Processing Method, and Display Unit According to Embodiment of Present Disclosure The picture signal processing circuit, the picture signal processing method, and the display unit according to the respective embodiments of the disclosure may each have a configuration in which an offset component to be provided to a gamma-corrected picture signal is set to a value corresponding to a shift amount of gamma characteristics that is generated when one or both of a refresh rate and a light emission duty are varied.

In the picture signal processing circuit, the picture signal processing method, and the display unit according to the respective embodiments of the disclosure each including the above-described preferable configuration, a gamma modification section may include an offset component generation section and an adder section. The offset component generation section performs processing to generate an offset component corresponding to one or both of the refresh rate and the light emission duty. The adder section performs processing to add the offset component to the picture signal gamma corrected by a gamma correction section.

In the picture signal processing circuit, the picture signal processing method, and the display unit according to the respective embodiments of the disclosure each including the above-described preferable configuration, the offset component generation section may include a table that holds offset components corresponding to one or both of the refresh rate and the light emission duty. At this time, the offset component generation section selects an offset component corresponding to one or both of the refresh rate and the light emission duty, from the table, and outputs the selected offset component.

Alternatively, in the picture signal processing circuit, the picture signal processing method, and the display unit according to the respective embodiments of the disclosure each including the above-described preferable configuration, the offset component generation section may include a light emission time amount calculation section and a light emission time amount calculation section. The light emission time amount calculation section performs processing to calculate a light emission time amount based on one or both of the refresh rate and the light emission duty. The table holds offset components corresponding to the light emission time amount. Then, the offset component generation section selects an offset component corresponding to the light emission time amount that is calculated by the light emission time amount calculation section, from the table, and outputs the selected offset component.

Alternatively, in the picture signal processing circuit, the picture signal processing method, and the display unit according to the respective embodiments of the disclosure each including the above-described preferable configuration, the offset component generation section may include a light emission time amount calculation section and an offset calculation section. The light emission time amount calculation section performs processing to calculate a light emission time amount based on one or both of the refresh rate and the light emission duty. The offset calculation section performs processing to calculate an offset component based on the light emission time amount that is calculated by the light emission time amount calculation section.

Alternatively, in the picture signal processing circuit, the picture signal processing method, and the display unit according to the respective embodiments of the disclosure each including the above-described preferable configuration, it is premised that a dummy pixel is provided outside a display region of the display unit. Further, the offset component generation section may include a measurement section that measures luminance of the dummy pixel or a value of a current flowing through a light emitting element of the dummy pixel, and an offset calculation section that calculates an offset component based on the measurement result of the measurement section.

Display Unit to Which Technology of Present Disclosure is Applied (System Configuration)

FIG. 1 is a system configuration diagram illustrating outline of a basic configuration of an active matrix display unit to which a technology of the disclosure is applied.

The active matrix display unit is a display unit in which a current flowing through an electrooptical element (a light emitting element) is controlled by an active element provided in the same pixel as the electrooptical element, for example, by an insulated gate field effect transistor. As the insulated gate field effect transistor, typically, a thin film transistor (TFT) may be used.

Here, an active matrix organic EL display unit in which, for example, an organic EL element that is a current drive electrooptical element whose light emission luminance varies in response to a value of a current flowing through the element is used as the light emitting element of a pixel (a pixel circuit) is described as an example. Hereinafter, the "pixel circuit" is simply referred to as the "pixel" in some cases.

As illustrated in FIG. 1, an organic EL display unit 10 to which the technology of the disclosure is applied includes a pixel array section 30 in which a plurality of pixels 20 each including an organic EL element are two-dimensionally arranged in a matrix, and a drive circuit section (a drive section) disposed at the periphery of the pixel array section 30. For example, the drive circuit section may include a write scanning section 40, a drive scanning section 50, a signal output section 60, and the like that are mounted on a display panel 70, similarly to the pixel array section 30, and may drive the pixels 20 in the pixel array section 30. Note that some or all of the write scanning section 40, the drive scanning section 50, and the signal output section 60 may be provided outside the display panel 70.

Here, in a case where the organic EL display unit 10 supports color display, one pixel (a unit pixel) that is a unit forming a color image is configured of a plurality of sub-pixels. At this time, each of the sub-pixels corresponds to the pixel 20 in FIG. 1. More specifically, in the display unit supporting color display, one pixel may be configured of three sub-pixels, for example, a sub-pixel emitting red (R) light, a sub-pixel emitting green (G) light, and a sub-pixel emitting blue (B) light.

Incidentally, configuration of one pixel is not limited to the combination of the sub-pixels of three primary colors RGB, and sub-pixels of one or more colors may be added to the sub-pixels of three primary colors to configure one pixel. More specifically, for example, a sub-pixel emitting white (W) light may be added to configure one pixel in order to improve luminance, or one or more sub-pixels emitting complementary color light may be added to configure one pixel in order to expand color reproduction range.

In the pixel array section 30, with respect to arrangement of the pixels 20 in m rows and n columns, scan lines 31 ($31_1$ to $31_m$) and power supply lines 32 ($32_1$ to $32_m$) are arranged for each pixel row, along a row direction (arrangement direction of the pixels in a pixel row, or horizontal direction). Further, with respect to the arrangement of the pixels 20 in m rows and n columns, signal lines 33 ($33_1$ to $33_n$) are arranged for each pixel column, along a column direction (arrangement direction of the pixels in a pixel column, or vertical direction).

The scan lines $31_1$ to $31_m$ are connected to respective output ends of columns corresponding to the write scanning section 40. The power supply lines $32_1$ to $32_m$ are connected to respective output ends of rows corresponding to the drive scanning section 50. The signal lines $33_1$ to $33_n$ are connected to respective output ends of columns corresponding to the signal output section 60.

The write scanning section 40 is configured of a shift register circuit and the like. The write scanning section 40 sequentially supplies write scanning signals WS ($WS_1$ to $WS_m$) to the respective scan lines 31 ($31_1$ to $31_m$) to sequentially scan the pixels 20 of the pixel array section 30 in units of a column, namely, performs so-called line sequential scanning, in writing of the signal voltage of the picture signal to the pixels 20 of the pixel array section 30.

The drive scanning section 50 is configured of a shift register circuit and the like, similarly to the write scanning section 40. The drive scanning section 50 supplies power potential DS ($DS_1$ to $DS_m$) that is capable of switching over between first power potential $V_{ccH}$ and second power potential $V_{ccL}$ that is lower than the first power potential $V_{ccH}$, to the respective power supply lines 32 ($32_1$ to $32_m$) in synchronization with the line sequential scanning by the write scanning section 40. As will be described later, control of light emission and non-light emission (extinction) of the pixels 20 is performed by switching over of $V_{ccH}$ and $V_{ccL}$ of the power potential DS by the drive scanning section 50.

The signal output section 60 selectively outputs the signal voltage $V_{sig}$ of the picture signal corresponding to luminance information supplied from a signal supply source (not illustrated) (hereinafter, simply referred to as "signal voltage" in some cases) and a reference voltage $V_{ofs}$. Here, the reference voltage $V_{ofs}$ is a reference voltage for the signal voltage $V_{sig}$ of the picture signal (for example, a voltage corresponding to black level of the picture signal), and is used in threshold correction processing described later.

The signal voltage $V_{sig}$ or the reference voltage $V_{ofs}$ output from the signal output section 60 is written in the pixels 20 of the pixel array section 30 through the respective signal lines 33 ($33_1$ to $33_n$) in units of a pixel row selected by the scanning of the write scanning section 40. In other words, the signal output section 60 employs a driving mode of line sequential writing in which the signal voltage $V_{sig}$ is written in units of a column (a line).

Pixel Circuit

FIG. 2 is a circuit diagram illustrating an example of a specific circuit configuration of the pixel (the pixel circuit) 20. A light emitting section of the pixel 20 is configured of an organic EL element 21 that is a current drive electrooptical element whose light emission luminance varies in response to a value of a current flowing through the element.

As illustrated in FIG. 2, the pixel 20 is configured of the organic EL element 21 and a drive circuit that allows a current to flow through the organic EL element 21 to drive the organic EL element 21. The organic EL element 21 has a cathode electrode connected to a common power line 34 that is arranged commonly to all of the pixels 20.

The drive circuit driving the organic EL element 21 includes a drive transistor 22, a sampling transistor 23, a retention capacitor 24, and an auxiliary capacitor 25. As each of the drive transistor 22 and the sampling transistor 23, for example, an N-channel TFT may be used.

Incidentally, a conductive combination of the drive transistor 22 and the sampling transistor 23 described here is merely an example without limitation. Specifically, a P-channel TFT may be used as one or both of the drive transistor 22 and the sampling transistor 23.

One of electrodes (source-drain electrodes) of the drive transistor 22 is connected to an anode electrode of the organic EL element 21, and the other electrode (the source-drain electrode) thereof is connected to the power supply line 32 ($32_1$ to $32_m$).

One of electrodes (source-drain electrodes) of the sampling transistor 23 is connected to the signal line 33 ($33_1$ to $33_n$), and the other electrode (the source-drain electrode) thereof is connected to a gate electrode of the drive transistor 22. The gate electrode of the sampling transistor 23 is connected to the scan line 31 ($31_1$ to $31_m$).

In the drive transistor 22 and the sampling transistor 23, one of the electrodes indicates a metal wiring electrically connected to one of source-drain regions, and the other electrode indicates a metal wiring electrically connected to the other of source-drain regions. Also, depending on the potential relationship between one of electrodes and the other electrode, the one of electrodes becomes a source electrode or a drain electrode, and the other electrode becomes the drain electrode or the source electrode.

One of electrodes of the retention capacitor 24 is connected to the gate electrode of the drive transistor 22, and the other electrode thereof is connected to the other electrode of the drive transistor 22 and the anode electrode of the organic EL element 21.

One of electrodes of the auxiliary capacitor 25 is connected to the anode electrode of the organic EL element 21, and the other electrode thereof is connected to a node of a fixed potential (in this example, the common power line 34 and the cathode electrode of the organic EL element 21). For example, the auxiliary capacitor 25 may be provided to compensate a shortage of the capacitance of the organic EL element 21, and to enhance writing gain of the picture signal to the retention capacitor 24. Incidentally, the auxiliary capacitor 25 is not an essential component. In other words, when it is unnecessary to compensate the shortage of the capacitance of the organic EL element 21, the auxiliary capacitor 25 is unnecessary.

In the pixel 20 having the above-described configuration, the sampling transistor 23 becomes conductive state in response to a high-active write scanning signal WS that is applied to the gate electrode thereof from the write scanning section 40 through the scan line 31. As a result, the sampling transistor 23 samples the signal voltage $V_{sig}$ of the picture signal corresponding to the luminance information or the reference voltage $V_{ofs}$ that is supplied from the signal output section 60 through the signal line 33 at different timing, and writes the sampled voltage in the pixel 20. The signal voltage $V_{sig}$ or the reference voltage $V_{ofs}$ that has been written by the sampling transistor 23 is applied to the gate electrode of the drive transistor 22 and is retained by the retention capacitor 24.

When the power potential DS of the power supply line 32 ($32_1$ to $32_m$) is at the first power potential $V_{ccH}$, one of the electrodes of the drive transistor 22 becomes a drain electrode and the other electrode becomes a source electrode, and therefore the drive transistor 22 operates in a saturated region. As a result, the drive transistor 22 is supplied with a current from the power supply line 32 to perform light emission driving of the organic EL element 21 by current driving. More specifically, the drive transistor 22 operates in the saturated region to supply a drive current of a current value corresponding to the voltage value of the signal voltage $V_{sig}$ retained by the retention capacitor 24, to the organic EL element 21, and performs current driving of the organic EL element 21 to allow the organic EL element 21 to emit light.

Further, when the power potential DS is switched over from the first power potential $V_{ccH}$ to the second power potential $V_{ccL}$, one of the electrodes of the drive transistor 22 becomes the source electrode and the other electrode becomes the drain electrode, and therefore the drive transistor 22 operates as a switching transistor. As a result, the drive transistor 22 stops supplying the drive current to the organic EL element 21 to put the organic EL element 21 into a non-light emission state. Specifically, the drive transistor 22 also has a function of a transistor that controls light emission and non-light emission of the organic EL element 21 based on switching over of the power potential DS ($V_{ccH}$ and $V_{ccL}$).

By the switching operation of the drive transistor 22, it is possible to provide a period (a non-light emission period) in which the organic EL element 21 is in a non-light emission state, and to control a ratio (duty) of the light emission period and the non-light emission period of the organic EL element 21. The duty control makes it possible to reduce afterimage blur caused by light emission of the pixel over one display frame period, and therefore, it is possible to make image quality of a moving picture more excellent in particular.

Out of the first and second power potential $V_{ccH}$ and $V_{ccL}$ that are selectively supplied from the drive scanning section 50 through the power supply line 32, the first power potential $V_{ccH}$ is power potential to supply the drive current that is used to perform light emission driving of the organic EL element 21, to the drive transistor 22. Also, the second power potential $V_{ccL}$ is power potential to apply reverse bias to the organic EL element 21. The second power potential $V_{ccL}$ is set to potential lower than the reference potential $V_{ofs}$, for example, when a threshold voltage of the drive transistor 22 is denoted by $V_{th}$, the second power potential $V_{ccL}$ is set to potential lower than $V_{ofs}-V_{th}$, preferably, to potential sufficiently lower than $V_{ofs}-V_{th}$.

Gamma Correction

Incidentally, it is known that the organic EL element 21 shows element-specific non-linear optical response to the drive voltage in the organic EL display unit 10. To address this non-linear optical response, gamma correction is performed on the picture signal input to the display panel 70.

On the other hand, when the current flows through the organic EL element 21 to allow the organic EL element 2 to emit light, charges are accumulated in the auxiliary capacitor 25 until the voltage between the both ends of the organic EL element 21 reaches a predetermined voltage. Accordingly, delay occurs after the current starts to flow through the organic EL element 21 until the organic EL element 21 emits light. The delay time depends on the current flowing through the organic EL element 21, and influences the ratio of the light emission time amount depending on the refresh rate (the frame rate) and the light emission duty. Here, "ratio of the light emission time amount" indicates a ratio of a light emission time amount determined by the light emission duty and an actual light emission time amount.

The refresh rate and the light emission duty are varied depending on a picture signal format such as NTSC format and PAL format, and a driving mode such as a moving picture mode and a still image mode. Further, even if the voltage value of the drive voltage (the signal voltage) is set so that the same light emission current is obtained, when the refresh rate or the light emission duty is varied, gamma characteristics (namely, characteristics of the light emission luminance to the drive voltage) vary, which causes variation of image quality.

Note that the pixel 20 having the above-described configuration includes the auxiliary capacitor 25 that is to compensate the shortage of the capacitance of the organic EL element 21 and to enhance the write gain of the picture signal to the retention capacitor 24. Incidentally, it is considered that a parasitic capacitance (an equivalent capacitance) of the organic EL element 21 influences the above-described delay similarly to the auxiliary capacitor 25 even in the pixel configuration in which the auxiliary capacitor 25 is unnecessary.

Here, variation of the gamma characteristics when the light emission duty or the refresh rate is varied is described.

FIG. 3A is a diagram illustrating variation of the gamma characteristics when the light emission duty is varied, and FIG. 3B is a diagram illustrating a low-luminance light emission region surrounded by a dashed line in FIG. 3A in an enlarged manner. Here, gamma characteristics at the light emission duty of 45%, 30%, and 20% are illustrated. In particular, it is found from FIG. 3B that the gamma characteristics vary depending on the light emission duty. More specifically, when the light emission duty is varied from 45% to 20% through 30%, the gamma characteristics vary (shift) to high grayscale side. Although the variation appears to be small, the variation is sufficiently recognizable visually in a region where the light emission luminance is low illustrated in FIG. 3B. The variation causes difference in brightness of the picture.

FIG. 4A is a diagram illustrating variation of the gamma characteristics when the refresh rate is varied, and FIG. 4B is a diagram illustrating a low-luminance light emission region surrounded by a dashed line in FIG. 4A in an enlarged manner. Here, the gamma characteristics at the refresh rate of 60 Hz, 90 Hz, and 120 Hz are illustrated. In particular, it is found from FIG. 4B that the gamma characteristics vary depending on the refresh rate. More specifically, when the refresh rate is varied from 60 Hz to 120 Hz through 90 Hz, the gamma characteristics vary (shift) to high grayscale side.

The generation principle of the variation of the gamma characteristics is described with reference to FIG. 5. When the current flows through the organic EL element 21 to allow the organic EL element 21 to emit light, a charge time is long in the low-luminance light emission region (a light emission section) due to the presence of the equivalent capacitance of the organic EL element 21 or the auxiliary capacitor 25 connected in parallel. Therefore, the organic EL element 21 does not emit light immediately after the current starts to flow through the organic EL element 21. Accordingly, average light emission luminance is largely varied depending on the light emission duty and the refresh rate that influence the light emission time amount.

Description of Embodiments

The embodiment of the disclosure is applied to a picture signal processing circuit including a gamma correction section, or a display unit including the picture signal processing circuit, for example, an organic EL display unit. Further, in the embodiment, to correct variation of the light emission luminance that occurs when one or both of the light emission duty and the refresh rate are varied, an offset component corresponding to one or both of the refresh rate and the light emission duty is provided to the gamma-corrected picture signal.

Specifically, in the picture signal processing circuit including the gamma correction section, the gamma correction section provides an offset component corresponding to one or both of the refresh rate and the light emission duty, to the picture signal gamma-corrected by the gamma correction section. More specifically, a gamma modification section that provides the offset component corresponding to one or both of the refresh rate and the light emission duty is provided at a rear stage of the gamma correction section.

When one or both of the refresh rate and the light emission duty are varied, the gamma characteristics vary (shift) in a grayscale direction (a magnitude direction of the signal voltage and the drive voltage). Therefore, the offset component corresponding to one or both of the refresh rate and the light emission duty is provided to the gamma-corrected picture signal. The offset component is set to a value corresponding to the shift amount (the variation) of the gamma characteristics that is generated when one or both of the refresh rate and the light emission duty are varied.

Providing the offset component of the value corresponding to the shift amount of the gamma characteristics to the gamma-corrected picture signal makes it possible to correct (cancel) the variation of the gamma characteristics. The offset component may be preferably set to the value corresponding to the shift amount of the gamma characteristics; however, the offset component is not limited thereto. Providing the offset component of a predetermined value to the gamma-corrected picture signal makes it possible to suppress the variation of the gamma characteristics as compared with the case where an offset component is not provided.

As an example, FIG. 6 illustrates a graph in which luminance ratios with and without correction for the variation of the gamma characteristics when the light emission duty is set to 45%, are plotted with the gamma characteristics in which the light emission duty is 20%, as reference. In the case without the correction, namely, in the case of the light emission duty of 45%, the luminance ratio with the light emission duty of 20% is about 2.0 when the luminance is 0.06% or lower. In contrast, in the case with the correction, namely, in the case of the light emission duty of 45% and offset components, the luminance ratio with the light emission duty of 20% is about 1.0 when the luminance is 0.06% or lower.

In this way, when the correction to provide the offset component corresponding to the refresh rate or the light emission duty is performed on the gamma-corrected picture signal, it is possible to obtain a result close to the reference gamma characteristics even in the low-luminance light emission region that is easily recognized visually. As a result, it is possible to obtain a picture without variation of image quality even if the refresh rate and the light emission duty are varied.

Hereinafter, specific embodiments of the picture signal processing circuit of the present embodiment, more specifically, some embodiments of the gamma modification section are described.

FIG. 7A is a block diagram illustrating a configuration of a picture signal processing circuit according to embodiment 1. As illustrated in FIG. 7A, a picture signal processing circuit 80A according to the embodiment 1 includes a gamma correction section 81 and a gamma modification section 82, and supplies a picture signal that has been subjected to the gamma correction and the gamma modification, to the signal output section 60 of the display panel 70. The same applies to embodiments described below.

In the embodiment 1, the gamma correction section 81 may be configured of, for example, a correction table (a conversion table) 811. The same applies to the embodiments described below. The correction table 811 holds gamma correction data based on a gamma correction curve that is determined corresponding to element-specific non-linear optical response characteristics, as a table. The gamma correction section 81 performs the gamma correction on an input picture signal with use of the correction table 811 to convert the input picture signal into a picture signal matched with the gamma characteristics of the display panel 70.

In the embodiment 1, the gamma modification section 82 includes an offset component generation section 821 that generates an offset component corresponding to the light emission duty or the refresh rate, and an adder section 822 that adds (including subtraction) the offset component to the picture signal gamma-corrected by the gamma correction section. Further, in the embodiment 1, as the offset component generation section 821, for example, a table (an offset table) may be used. The offset table is a three-dimensional table that holds offset components (offset values) corresponding to the light emission duty and the refresh rate.

In the gamma modification section 82 having the above-described configuration, the offset component generation section 821 selects an offset component corresponding to the light emission duty or the refresh rate from the offset table, and outputs the selected offset component. The offset component is set corresponding to the shift amount (the variation) of the gamma characteristics that is generated when the light emission duty or the refresh rate is varied. Therefore, as illustrated in FIG. 7B, the adder section 822 adds an offset component a that is output from the offset component generation section 821, to a gamma-corrected signal V2 to modify a black level thereof, and thus obtains a gamma-modified signal V1, which makes it possible to correct the shift amount (the variation) of the gamma characteristics.

Incidentally, in the case where the shift amount of the gamma characteristics is corrected with use of the table, a method in which a table corresponding to the light emission duty to be varied and a table corresponding to the refresh rate to be varied are prepared may be considered. In the case where this method is employed, however, tables for all combinations of the light emission duty to be varied and the refresh rate to be varied are necessary. Therefore, the circuit configuration becomes complicated and scale of the circuit becomes large. In contrast, in the embodiment 1, the tables for all combinations of the light emission duty and the refresh rate are unnecessary and only one offset table that is the three-dimensional table is necessary. Therefore, it is possible to achieve simplification of the circuit configuration and reduction of the scale of the circuit.

Embodiment 2

FIG. 8 is a block diagram illustrating a configuration of a picture signal processing circuit according to embodiment 2. As illustrated in FIG. 8, in a picture signal processing circuit 80B according to the embodiment 2, the gamma modification section 82 includes a light emission time amount calculation section 823 and an offset table 823 in addition to the adder section 822.

The light emission time amount of the organic EL element 21 is determined based on the refresh rate (the frame rate) and the light emission duty. The light emission time amount calculation section 823 calculates the light emission time amount of the organic EL element 21 based on one or both, preferably both of the refresh rate and the light emission duty. The offset table 823 is a two-dimensional table that holds offset components (offset values) corresponding to the light emission time amount of the organic EL element 21.

In the picture signal processing circuit 80B according to the embodiment 2 having the above-described configuration, an offset component corresponding to the light emission time amount that is calculated by the light emission time amount calculation section 823 is selected from the offset table 823 and outputs the selected offset component. Then, the offset component selected from the offset table 823 is added (including subtraction) to the picture signal gamma-corrected by the gamma correction section 81, by the adder section 822.

Also in the picture signal processing circuit 80B according to the embodiment 2, similarly to the picture signal processing circuit 80A according to the embodiment 1, it is possible to correct the shift amount (the variation) of the gamma characteristics that is generated when the light emission duty or the refresh rate is varied. In addition, the three-dimensional table is necessary as the offset component generation section 821 in the embodiment 1, whereas the two-dimensional table is necessary as the offset table 823 in the embodiment 2. Therefore, the scale of the table is advantageously further reduced as compared with the case of the embodiment 1.

Embodiment 3

FIG. 9A is a block diagram illustrating a configuration of a picture signal processing circuit according to embodiment 3, and FIG. 9B is an explanatory diagram for a conversion expression of the offset component (the offset amount). As illustrated in FIG. 9A, in a picture signal processing circuit 80C according to the embodiment 3, an offset calculation section is used in place of the offset table 823 in the embodiment 2. The offset calculation section 825 calculates an offset component (an offset amount, or an offset value) corresponding a light emission time amount based on the light emission time amount calculated by the light emission time amount calculation section 823.

Here, in the offset calculation section 825, a conversion expression used to calculate the offset component (the offset amount) based on the light emission time amount is described with reference to FIG. 9B.

Two assumed light emission periods $t_1$ and $t_2$ are considered. Here, when the light emission duty [%] are denoted by $d_1$ and $d_2$, the refresh rates [Hz] are denoted by $f_1$ and $f_2$, $t_1=d_1/f_1$ and $t_2=d_2/f_2$ are established. In this case, when the current values of the drive transistor 22 (see FIG. 2) at the time of starting light emission are denoted by $I_{ds1}$ and $I_{ds2}$, the following expression is established.

$$I_{ds1} \times t_1 = I_{ds2} \times t_2 = S$$

Here, S represents a fixed value, and is a charge amount charged in the auxiliary capacitor 25 (see FIG. 2) at the time of non-light emission.

Moreover, when difference between the current values $I_{ds1}$ and $I_{ds2}$ is small, the relationship between the grayscale and the current is considered to be substantially linear relationship. Therefore, the offset amount (the offset component) when the assumed light emission period is changed from the assumed light emission period $t_1$ to the assumed light emission period $t_2$ is represented in the following expression.

$$\begin{aligned} \text{Offset Amount} &= \alpha \times (I_{ds2} - I_{ds1}) \\ &= \alpha \times \{(S/t_2) - I_{ds1}\} \\ &= (\alpha \times S/t_2) - \alpha \times I_{ds1} \end{aligned}$$

Here, $\alpha$ represents a conversion coefficient from the current value $I_{ds}$ of the drive transistor 22 to grayscale, and is a fixed value determined in pixel design.

Accordingly, when the light emission condition of the assumed light emission period $t_1$ is used as a reference, each of $\alpha \times S$ and $\alpha \times I_{ds1}$ becomes a fixed value. Therefore, it is possible to calculate the offset amount (the offset component) with the assumed light emission period $t_2$ as a parameter.

In this way, also in the embodiment 3 in which the light emission time amount is calculated based on one or both of the refresh rate and the light emission duty, and the offset component is calculated based on the light emission time amount, it is possible to correct the shift amount (the variation) of the gamma characteristics that is generated when the light emission duty or the refresh rate is varied.

Embodiment 4

FIG. 10 is a block diagram illustrating a configuration of a picture signal processing circuit according to embodiment 4. As illustrated in FIG. 10, in the embodiment 4, it is premised that a dummy pixel 20A is provided outside a display region of the display panel (the display unit). Further, luminance of the dummy pixel 20A or a value of a current flowing through the light emitting element (the organic EL element) of the dummy pixel 20A is measured by a measurement section 90. The measurement section 90 is configured of a luminance sensor, an ammeter, or the like.

Also, in a picture signal processing circuit 80D according to the embodiment 4, the gamma modification section 82 includes an offset calculation section 826 in addition to the adder section 822. The offset calculation section 826 calculates an offset component (an offset amount or an offset value) based on a measurement result of the measurement section 90, namely, the luminance of the dummy pixel 20A or the value of the current flowing through the light emitting element of the dummy pixel 20A.

In this way, also in the embodiment 4 in which the luminance of the dummy pixel 20A or the value of the current flowing through the light emitting element of the dummy pixel 20A is measured and the offset component is calculated based on the measurement result, it is possible to correct the shift amount (the variation) of the gamma characteristics that is generated when the light emission duty or the refresh rate is varied.

Modifications

Hereinbefore, although the technology of the disclosure has been described with use of the embodiments, the technology of the disclosure is not limited to the above-described embodiments. Specifically, various modifications or improvements may be added to the above-described embodiments without departing from the scope of the technology of the disclosure, and the embodiments added with such modifications or improvements are also included in the technical scope of the technology of the disclosure.

For example, in the above-described embodiments, the drive circuit driving the organic EL element 21 is a 2Tr2C circuit that is configured of two transistors (22 and 23) and two capacitors (24 and 25). However, the configuration of the drive circuit is not limited thereto. For example, the drive circuit may have a circuit configuration in which a switching transistor selectively providing the reference voltage $V_{ofs}$ that is used in the threshold correction, to the drive transistor 23 is added, or a circuit configuration in which one or a plurality of transistors are added as necessary.

Moreover, in the above-described embodiments, the case where the technology of the disclosure is applied to the organic EL display unit in which the organic EL element is used as the electrooptical element of the pixel 20 has been described as an example. However, the disclosure is not limited to the application example. Specifically, the technology of the disclosure is applicable to general display units that use a current drive electrooptical element whose light emission luminance varies in response to the value of the current flowing through the element, such as an inorganic EL element, an LED element, and a semiconductor laser element.

Note that the disclosure may be configured as follows.

[1] A picture signal processing circuit including:

a gamma correction section configured to perform gamma correction on a picture signal; and a gamma modification section configured to provide an offset component to the picture signal gamma-corrected by the gamma correction section, the offset component corresponding to one or both of a refresh rate and a light emission duty.

[2] The picture signal processing circuit according to [1], wherein the gamma modification section includes an offset component generation section configured to generate an offset component corresponding to one or both of the refresh rate and the light emission duty, and an adder section configured to add the offset component to the picture signal gamma-corrected by the gamma correction section.

[3] The picture signal processing circuit according to [2], wherein the offset component generation section includes a table that stores offset components each corresponding to one or both of the refresh rate and the light emission duty, and the offset component generation section selects one of the offset components that corresponds to one or both of the refresh rate and the light emission duty from the table, and outputs the selected offset component.

[4] The picture signal processing circuit according to [2], wherein the offset component generation section includes a light emission time amount calculation section configured to calculate a light emission time amount based on one or both of the refresh rate and the light emission duty, and a table that stores offset components corresponding to respective light emission time amounts, and the offset component generation section selects one of the offset components that corresponds to the light emission time amount calculated by the light emission time amount calculation section, from the table, and outputs the selected offset component.

[5] The picture signal processing circuit according to [2], wherein the offset component generation section includes a light emission time amount calculation section that is configured to calculate a light emission time amount based on one or both of the refresh rate and the light emission duty, and an offset calculation section configured to calculate the offset component based on the light emission time amount calculated by the light emission time amount calculation section.

[6] The picture signal processing circuit according to [2], further including:

a measurement section configured to measure luminance of a dummy pixel or a value of a current flowing through a light emitting element of the dummy pixel, the dummy pixel being provided outside a display region of a display unit; and an offset calculation section configured to calculate the offset component based on a measurement result of the measurement section.

[7] The picture signal processing circuit according to any one of [1] to [6], wherein the offset component is set to a value corresponding to a shift amount of gamma characteristics, the shift amount of gamma characteristics being derived from variation in one or both of the refresh rate and the light emission duty.

[8] A picture signal processing method including providing an offset component corresponding to one or both of a refresh rate and a light emission duty, to a gamma-corrected picture signal.

[9] A display unit provided with a picture signal processing circuit, the picture signal processing circuit including:

a gamma correction section configured to perform gamma correction on a picture signal; and a gamma modification section configured to provide an offset component to the picture signal gamma-corrected by the gamma correction section, the offset component corresponding to one or both of a refresh rate and a light emission duty.

REFERENCE SIGNS LIST

10 . . . organic EL display unit, 20 . . . pixel, 20A . . . dummy pixel, 21 . . . organic EL element, 22 . . . drive transistor, 23 . . . sampling transistor, 24 . . . retention capacitor, 25 . . . auxiliary capacitor, 30 . . . pixel array section, 31 ($31_1$ to $31_m$) . . . scan line, 32 ($32_1$ to $32_m$) . . .

power supply line, 33 (33₁ to 33ₙ) . . . signal line, 40 . . . write scanning section, 50 . . . drive scanning section, 60 . . . signal output section, 70 . . . display panel, 80A, 80B, 80C, 80D . . . signal processing circuit, 81 . . . gamma correction section, 82 . . . gamma modification section, 90 . . . measurement section, 821 . . . offset component generation section, 822 . . . adder section, 823 . . . light emission time amount calculation section, 824 . . . offset table, 825, 826 . . . offset calculation section, WS (WS₁ to WS_m) . . . write scanning signal, DS (DS₁ to DS_m) . . . potential of power supply line (power potential)

What is claimed is:

1. A picture signal processing circuit comprising:
a gamma correction section configured to perform gamma correction on a picture signal;
a gamma modification section configured to provide an offset component to the picture signal that is gamma-corrected by the gamma correction section, the offset component corresponding to at least a light emission duty; and
a measurement section configured to measure a luminance of a light-emitting element of a dummy pixel or a value of a current flowing through the light-emitting element of the dummy pixel, the dummy pixel being provided outside a display region of a display unit, the display unit including at least one pixel that includes a light-emitting element,
the gamma modification section including
an offset component generation section configured to generate the offset component, and
an adder section configured to add the offset component to the picture signal that is gamma-corrected by the gamma correction section, and
the offset component generation section including an offset calculation section configured to calculate the offset component based on a measurement result of the measurement section.

2. The picture signal processing circuit according to claim 1, wherein the offset component corresponds to the light emission duty and a refresh rate.

3. A picture signal processing method, the method comprising:
preparing a gamma-corrected picture signal;
measuring a luminance of a light-emitting element of a dummy pixel or a value of a current flowing through the light-emitting element of the dummy pixel, the dummy pixel being provided outside a display region of a display unit, the display unit including at least one pixel that includes a light-emitting element; and
providing an offset component corresponding to at least a light emission duty to the gamma-corrected picture signal,
wherein providing the offset component further includes calculating the offset component based on a result of the measuring of the luminance or the value of the current, and
adding the offset component to the gamma-corrected picture signal that is gamma-corrected.

4. The picture signal processing method according to claim 3, wherein the offset component corresponds to the light emission duty and a refresh rate.

5. A display unit comprising:
a display including at least one pixel, the at least one pixel comprising a light-emitting element; and
a picture signal processing circuit including
a gamma correction section configured to perform gamma correction on a picture signal,
a gamma modification section configured to provide an offset component to the picture signal that is gamma-corrected by the gamma correction section, the offset component corresponding to at least a light emission duty, and
a measurement section configured to measure a luminance of a light-emitting element of a dummy pixel or a value of a current flowing through the light-emitting element of the dummy pixel, the dummy pixel being provided outside a display region of the display,
the gamma modification section including
an offset component generation section configured to generate the offset component, and
an adder section configured to add the offset component to the picture signal that is gamma-corrected by the gamma correction section, and
the offset component generation section including an offset calculation section configured to calculate the offset component based on a measurement result of the measurement section.

6. The display unit according to claim 5, wherein the offset component corresponds to the light emission duty and a refresh rate.

7. A picture signal processing circuit comprising:
a gamma correction section configured to perform gamma correction on a picture signal; and
a gamma modification section configured to provide an offset component to the picture signal that is gamma-corrected by the gamma correction section, the offset component corresponding to one or both of a refresh rate and a light emission duty,
the gamma modification section including
an offset component generation section configured to generate the offset component, and
an adder section configured to add the offset component to the picture signal that is gamma-corrected by the gamma correction section, and
the offset component generation section including
a light emission time amount calculation section configured to calculate, based on one or both of the refresh rate and the light emission duty, a light emission time amount of a light-emitting element included in a pixel, and
an offset calculation section configured to calculate, based on the light emission time amount that is calculated by the light emission time amount calculation section, the offset component having an offset amount that is larger as the light emission time amount becomes shorter.

8. The picture signal processing circuit according to claim 7, wherein the offset calculation section calculates the offset component by determining the offset amount by the following expression:

$$\text{offset amount} = \alpha \times Ids1 \times (t1/t2 - 1)$$

where
t1 is the light emission time amount calculated by the light emission time amount calculation section in a first operation,
t2 is the light emission time amount calculated by the light emission time amount calculation section in a second operation that is different from the first operation in one or both of the refresh rate and the light emission duty,
Ids1 is a value of a current upon light emission that flows through a drive transistor in the first operation, the drive transistor driving the light-emitting element,
α is a predetermined constant, and
the offset amount is the offset component in the second operation that is changed from the first operation.

9. A picture signal processing method comprising:
preparing a gamma-corrected picture signal; and
providing an offset component corresponding to one or both of a refresh rate and a light emission duty, to the gamma-corrected picture signal,
wherein providing the offset component includes
calculating, based on one or both of the refresh rate and the light emission duty, a light emission time amount of a light-emitting element included in a pixel,
calculating, based on the light emission time amount that is calculated, the offset component having an offset amount that is larger as the light emission time amount becomes shorter, and
adding the offset component to the gamma-corrected picture signal that is gamma-corrected.

10. The picture signal processing method according to claim 9, wherein the calculating the offset component determines the offset amount by the following expression:

$$\text{offset amount} = \alpha \times Ids1 \times (t1/t2 - 1)$$

where
t1 is the light emission time amount calculated in a first operation,
t2 is the light emission time amount calculated in a second operation that is different from the first operation in one or both of the refresh rate and the light emission duty,
Ids1 is a value of a current upon light emission that flows through a drive transistor in the first operation, the drive transistor driving the light-emitting element,
α is a predetermined constant, and
the offset amount is the offset component in the second operation that is changed from the first operation.

11. A display unit comprising:
a display including at least one pixel, the at least one pixel comprising a light-emitting element and a drive transistor that drives the light-emitting element; and
a picture signal processing circuit including
a gamma correction section configured to perform gamma correction on a picture signal, and
a gamma modification section configured to provide an offset component to the picture signal that is gamma-corrected by the gamma correction section, the offset component corresponding to one or both of a refresh rate and a light emission duty,
the gamma modification section including
an offset component generation section configured to generate the offset component, and
an adder section configured to add the offset component to the picture signal that is gamma-corrected by the gamma correction section, and
the offset component generation section including
a light emission time amount calculation section configured to calculate, based on one or both of the refresh rate and the light emission duty, a light emission time amount of the light-emitting element, and
an offset calculation section configured to calculate, based on the light emission time amount that is calculated by the light emission time amount calculation section, the offset component having an offset amount that is larger as the light emission time amount becomes shorter.

12. The display unit according to claim 11, wherein the offset calculation section calculates the offset component by determining the offset amount by the following expression:

$$\text{offset amount} = \alpha \times Ids1 \times (t1/t2 - 1)$$

where
t1 is the light emission time amount calculated by the light emission time amount calculation section in a first operation,
t2 is the light emission time amount calculated by the light emission time amount calculation section in a second operation that is different from the first operation in one or both of the refresh rate and the light emission duty,
Ids1 is a value of a current upon light emission that flows through the drive transistor in the first operation, the drive transistor driving the light-emitting element,
α is a predetermined constant, and
the offset amount is the offset component in the second operation that is changed from the first operation.

* * * * *